April 16, 1963

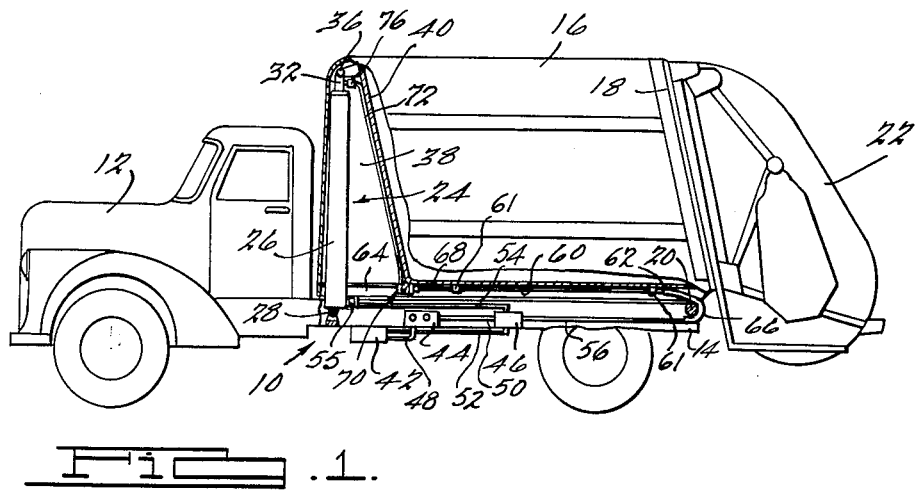

J. McCARTHY 3,085,828

TELESCOPIC HOIST ASSEMBLY FOR TILTING
BODIES OF DUMPING VEHICLES

Filed May 4, 1959

INVENTOR.
John McCarthy
BY
Harness, Dickey & Pierce
ATTORNEYS.

United States Patent Office 3,085,828
Patented Apr. 16, 1963

3,085,828
TELESCOPIC HOIST ASSEMBLY FOR TILTING BODIES OF DUMPING VEHICLES
John McCarthy, Dearborn, Mich., assignor to Gar Wood Industries, Inc., Wayne, Mich., a corporation of Michigan
Filed May 4, 1959, Ser. No. 810,825
2 Claims. (Cl. 298—22)

This invention relates generally to vehicles provided with dump bodies and more particularly to the assembly of a telescopic hoist with a dump body for raising and lowering the body.

Vehicles that are provided with dump bodies, such as refuse collecting trucks, are usually equipped with a telescopic hoist or the equivalent for lifting the front end of the dump body to a position in which it is inclined so that its contents will be discharged. In vehicles in which the body is mounted so that it is movable to an over-center position relative to its pivotal axis, so that in this position its weight cannot be utilized to return it to a horizontal loading position, the hoist must be of the double acting type so that it can be operated to provide a downward force on the body to return it to its loading position. Such a hoist requires fluid supply connections at both its upper and lower ends. If ordinary flexible hoses are connected to the upper end of the hoist, they must be long enough to reach the upper end when the hoist is extended. As a result, when the hoist is retracted these hoses take up considerable space and are likely to become entangled in other vehicle parts. Telescopic hoists having internal piping for conveying fluid from the lower to the upper end of the hoist have also been used but are objectionable from a cost standpoint. It is the primary object of this invention, therefore, to provide a telescopic hoist assembly with a dump body which does not require either long flexible hoses or internal piping and involves only the assembly of fixed conduits on the vehicle frame and the dump body and a flexible hose extending between the fixed conduits at a position adjacent the pivotal connection of the body to the vehicle.

A further object of this invention is to provide a telescopic hoist assembly with a vehicle dump body which is simple in construction, economical to manufacture and install, and efficient in operation in moving a dump body between its loading and dumping positions.

Further objects, features and advantages of this invention will become apparent from a consideration of the following description, the appended claims and the accompanying drawing in which:

FIGURE 1 is a side elevational view of a refuse collecting truck provided with the telescopic hoist assembly of this invention, with some parts broken away and other parts shown in section for the purpose of better illustrating the hoist assembly, and showing the dump body in a horizontal loading position;

FIG. 2 is a side elevation view, illustrated similarly to FIG. 1, showing the dump body in an inclined dump position;

Figure 3:
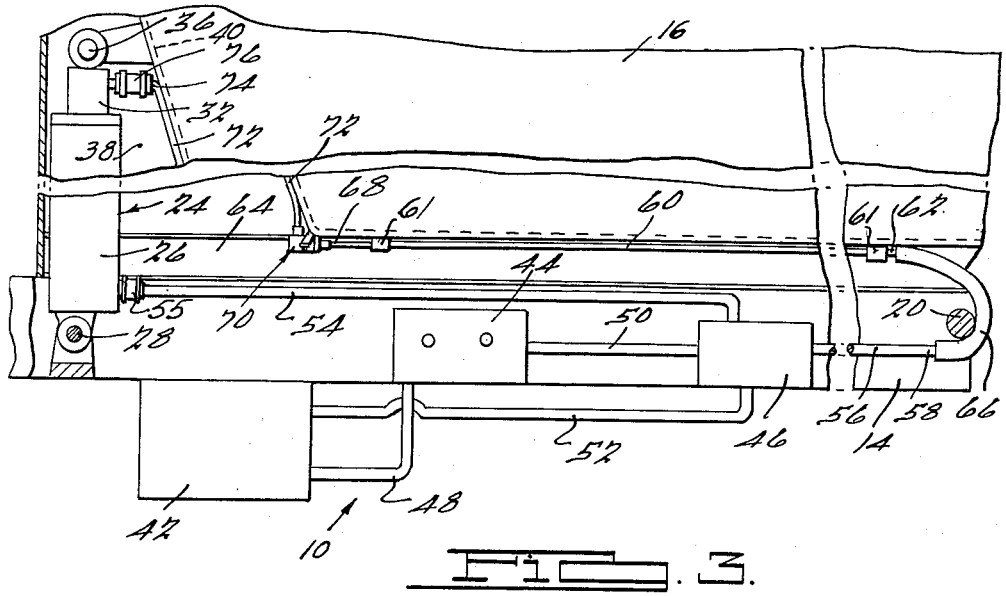
FIG. 3 is a fragmentary side view of the hoist assembly of this invention.
Figure 4:
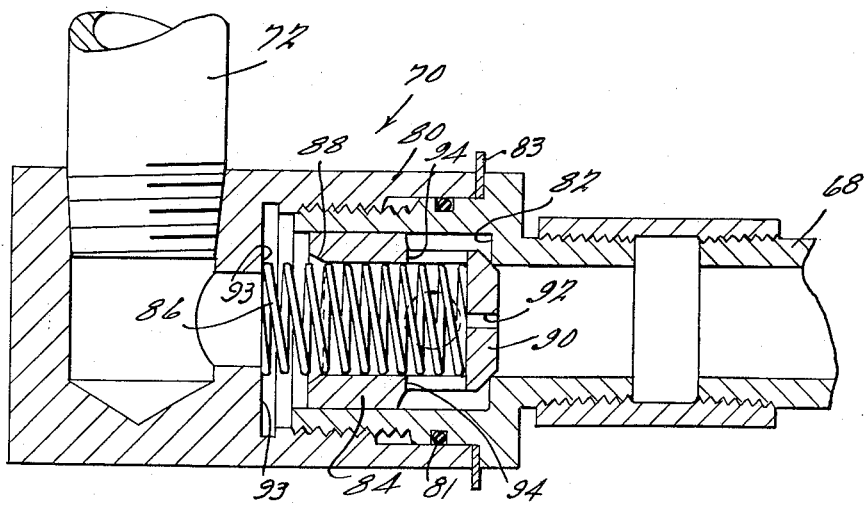
FIG. 4 is a longitudinal sectional view of a valve in the hoist assembly of this invention.

With reference to the drawing, the telescopic hoist assembly of this invention, indicated generally at 10, is illustrated in FIG. 1 mounted on a refuse collecting truck 12 having a main frame 14 and a dump body 16 which is pivotally supported adjacent its rear end 18 on suitable shaft means 20 carried by the truck frame 14. The body 16 has a tailgate assembly 22 mounted on the rear end thereof for movement between a position shown in FIG. 1 in which it closes the rear end of the body 16 and an open position shown in FIG. 2 in which it is lifted to a position out of the path of refuse being discharged from the open rear end 18 of the body 16. Any suitable mechanism, such as hydraulic cylinder assemblies (not shown) extending between the body 16 and the tailgate 22 may be employed for moving the tailgate 22 between the positions shown in FIGS. 1 and 2. The tailgate 22 carries a loader mechanism (not shown) for loading refuse therefrom into the body 16.

The hoist assembly 10 includes a telescopic hoist unit 24 of a type which consists of an outer cylinder 26 that is pivotally mounted at its lower end on a shaft 28 carried by the frame 14. An intermediate hoist section 30 may be telescoped into the cylinder 26 and an end section 32 may be telescoped within the section 30 and is connected at its upper end by a suitable pivot 36 to the front side of the body 16 adjacent the upper end thereof. As shown in FIG. 1, the assembly 24 is disposed in a cavity 38 or chamber in the front end of the body 16 which is separated by a wall 40 from the portion of the body 16 into which refuse is loaded.

The hydraulic mechanism for operating the telescoping hoist unit 24 includes a tank or reservoir 42 for fluid, a pump 44 and a control valve 46, and all of these components are mounted on the frame 14, as shown in FIG. 3. The pump 44 is driven through suitable means interconnecting with the truck engine or other source of power in a conventional manner and the valve 46 is interconnected by suitable linkage means with a conventional lever arm arrangement inside the truck cab for operating the valve 46 in a conventional manner. The tank 42 is connected by a line 48 to the pump 44 which is connected by a line 50 to the valve 46 which is in turn connected back to the tank through a line 52. As used herein, the term "line" designates a conduit through which fluid can flow. A line 54 connects the valve 46 with the lower end of the cylinder 26 and a line 56 is connected to the valve 46 and extends rearwardly therefrom so that its rear end 58 is disposed adjacent the shaft means 20 on which the dump body 16 is supported. All of the fluid lines 48, 50, 52, 54 and 56 may consist of either suitable rigid piping mounted on the frame 14 or flexible piping, although the flexible characteristic of the piping has no function in the assembly 10. Since the cylinder 26 does pivot somewhat about the support 28 therefor on the frame 14, it is easier to connect the line 54 to the cylinder 26 by means of a short flexible hose connection 55.

A fluid line 60 is secured by means of suitable fastening devices, such as tabs 61, to a frame 64 which extends along the underside of the body 16. The rear end 62 of the line 60 terminates adjacent the shaft means 20 and is connected to the rear end 58 of the line 56 by a flexible hose 66 which is illustrated as extending around the rear side of the shaft means 20, for conducting fluid between the lines 56 and 60.

The front end 68 of the line 60 is connected to a check valve unit 70 mounted on the frame member 64. A fluid line 72 extends upwardly from the valve 70 in the cavity 38 so that its upper end 74 is adjacent the pin connection 36 for the telescoping section 32 on the body 16. A short length of flexible hose 76 connects the upper end 74 of the line 72 with the upper end of the telescoping section 32.

When the pump 44 and the valve 46 are manipulated to supply fluid under pressure through the line 54 to the lower end of the cylinder 26, the telescopic hoist 24 is extended as illustrated in FIG. 2. When the valve 46 is manipulated to provide for a flow of fluid under pressure through the lines 56, 60 and 72 to the upper end of the telescopic hoist section 32, the hoist 24 is retracted to the position shown in FIG. 1.

When the hoist 24 is extended, the front end of the dump body 16 is moved upwardly to incline the body 16 downwardly and rearwardly as shown in FIG. 2 so that the contents thereof will be discharged through the rear end 18. The amount of fluid discharged from the hoist assembly 24 through the upper end of the section 32 during extension thereof is limited by a valve 70 which is hereinafter referred to as a "snubber valve" because it acts to check the rate of extension of the cylinder assembly 24.

The valve 70 includes a two-piece casing 80, the two halves of which are threadably joined using for sealing an O-ring 81 and a gasket 83, having a valve member 84 slidably mounted therein and adapted to be urged by spring means toward an annular shelf which forms a valve seat 82. More particularly, the valve member 84 is of a tubular shape, being completely open at the end 88 thereof and being closed at the opposite end by a plate 90 which has an axial opening 92. The valve member 84 is urged toward seat 82 by means of a spring 86 which is representatively illustrated as being mounted within the tubular valve member 84 with one end thereof engaging one surface of the plate 90 and the opposite end thereof engaging an annular shelf 93 in the inner surface of casing 80 adjacent the open end 88 of valve member 84. The valve member 84 has a plurality of openings 94 which extend through the side wall thereof. During flow of fluid from the line 72 to the line 60, through the casing 80, the line 60 communicates through valve 46 with the tank 42 and the spring 86 maintains the valve member 84 seated on the seat 82 so that the volume of fluid that can flow from the line 72, through the valve 70 and out the line 62 is restricted to the amount that can flow through the opening 92.

When the body 16 is raised toward its dumping position shown in FIGURE 2, fluid passes through conduit 54 into cylinder 26 of hoist 24. The hoist sections 30 and 32 then move in a conventional manner toward their extended positions illustrated in FIGURE 2. Such movement forces fluid from the upper end of the hoist 24 in a conventional manner and this fluid passes through line 72, valve 70, line 60, valve 46, and line 52 to tank 42. The normal rate at which the hoist is extended is controlled in a conventional manner in accordance with the rate of output of pump 44. The maximum rate of extension, however, is controlled by valve 70.

For example, once the body 16 has been moved to an overcenter position relative to the shaft means 20, its weight tends to rapidly move it further in a clockwise direction as viewed in FIG. 2, to thereby further extend the cylinder assembly 24. The valve 70 acts to limit the speed at which this further extension occurs because the assembly 24 can extend only as fast as the fluid can be expelled through the line 72 into line 60. Stated otherwise, once the center of gravity of the combined body 16 and open tailgate 22 moves rearwardly of a vertical plane extending through the shaft means 20, the weight of the combined body 16 and tailgate 22 will tend to move the body 16 further in a clockwise direction. Such movement is limited by the telescoping hoist assembly 24 since this rotation can only take place as fast as fluid can flow through the opening 92 in the valve member 84.

When the body 16 is to be returned to its loading position shown in FIG. 1 from its dumping position shown in FIG. 2, the valve 46 is actuated so that fluid under pressure is supplied through the line 60 to the line 72 and thence to the upper end of the hoist section 32, and the line 54 is connected to the tank 42. This flow of fluid from the line 60 to the line 72 is not impeded or restricted by the valve 70 since the pressure of the fluid in the line 60 moves the valve member 84 off the seat 82 against the pressure of the spring 86. Consequently, fluid is free to flow from the line 60 through the valve member openings 94 into the line 72. As a result, the rate at which the body 16 can be returned to its loading position is restricted only by the capacity of the pump 44 and the size of the other hydraulic apparatus.

Because the flexible line 66 is positioned adjacent the shaft means 20, it functions somewhat like a hinge, merely moving between the curved positions illustrated in FIGS. 1 and 2. Consequently, the flexible hose 66 never restricts the flow of fluid therethrough and provides for a fluid-communication of the pump 44 and the upper end of the telescopic hoist assembly 24.

It will be understood that the specific construction of the improved telescopic hoist assembly with a dump body which is herein disclosed and described is presented for purposes of explanation and illustration and is not intended to indicate limits of the invention, the scope of which is defined by the following claims.

What is claimed is:

1. In a vehicle having a main frame, a dump body pivotally mounted on said main frame for up and down movement relative thereto about a horizontal axis between a substantially horizontal load position and an inclined dump position, the weight distribution of said body being such that its weight will not return it to said load position from its maximum dump position, a telescopic hydraulic hoist pivotally mounted at one of its ends on said frame and connected at its opposite end to said dump body for moving the body between said load and dump positions, means on said frame for supplying fluid under pressure, means for communicating said fluid to said one end of said hoist asesmbly for extending the assembly to move the dump body to said dump position, means for communicating said fluid to the opposite end of said hoist assembly for retracting the assembly to move the dump body to said horizontal position, said means for communicating fluid to said opposite end of said hoist assembly including first conduit means mounted on said main frame and second conduit means mounted on said body and connected to the opposite end of the hoist assembly, a flexible fluid passage member connecting said first and second conduit means adjacent said axis, and means restricting the flow of fluid in one of said conduit means when and only when said hoist assembly is being extended to limit the rate of extension thereof.

2. In a vehicle having a main frame, a dump body pivotally mounted on said main frame for up and down movement relative thereto about a horizontal axis between a substantially horizontal load position and an inclined dump position, the weight distribution of said body being such that its weight will not return it to said load position from its maximum dump position, a telescopic hydraulic hoist pivotally mounted at one of its ends on said frame and connected at its opposite end to said dump body for moving the body between said load and dump positions, means on said frame for supplying fluid under pressure, means for communicating said fluid to said one end of said cylinder assembly for extending the assembly to move the dump body to said dump position, means for communicating said fluid to the opposite end of said cylinder assembly for retracting the assembly to move the dump body to said horizontal position, said means for communicating said fluid to said opposite end including first conduit means mounted on said main frame and second conduit means mounted on said body and connected to the opposite end of the cylinder assembly, a flexible fluid passage member connecting said first and second conduit means and positioned adjacent said axis, valve means in one of said conduit means, said valve means including a casing, a valve member mounted in said casing for movement between a first position restricting the flow of fluid through said conduit means in a direction away from the opposite end of said cylinder assembly and a second position in which it does not restrict fluid flow in the opposite direction.

References Cited in the file of this patent

UNITED STATES PATENTS

| | | |
|---|---|---|
| 2,189,052 | Anthony | Feb. 6, 1940 |
| 2,231,058 | Doran | Feb. 11, 1941 |
| 2,401,498 | Monahan | June 4, 1946 |
| 2,699,268 | Miller | Jan. 11, 1955 |
| 2,741,383 | Leckert | Apr. 10, 1956 |
| 2,856,233 | Boyce et al. | Oct. 14, 1958 |
| 2,861,837 | Morse | Nov. 25, 1958 |
| 2,897,791 | Routledge | Aug. 4, 1959 |